United States Patent [19]

Roders

[11] 3,919,760

[45] Nov. 18, 1975

[54] APPARATUS AND METHOD FOR APPLYING STRIP SOLDER MATERIAL

[75] Inventor: George W. Roders, Kenosha, Wis.

[73] Assignee: Modine Manufacturing Company, Racine, Wis.

[22] Filed: Sept. 30, 1974

[21] Appl. No.: 510,487

[52] U.S. Cl............... 29/417; 29/33 K; 29/200 B; 29/471.1; 29/509; 29/515; 140/93 D; 228/14
[51] Int. Cl.².................... B23P 17/00; B23P 19/00
[58] Field of Search..... 29/500, 243.56, 509, 471.1, 29/515, 200 B, 417, 33 F, 33 K; 228/4, 14, 56; 140/93 D

[56] References Cited

UNITED STATES PATENTS

| | | | |
|---|---|---|---|
| 858,258 | 6/1907 | Briscoe | 29/500 |
| 1,296,656 | 3/1919 | Hamm | 228/14 X |
| 2,664,844 | 1/1954 | Siegrist et al. | 228/56 |
| 2,686,307 | 8/1954 | Franklin | 29/243.56 |
| 3,117,610 | 1/1964 | Matthews | 29/509 UX |
| 3,226,803 | 1/1966 | Samuels | 29/417 X |
| 3,496,629 | 2/1970 | Martucci et al. | 29/471.1 |
| 3,745,644 | 7/1973 | Moyer | 29/515 |
| 3,750,265 | 8/1973 | Cushman | 29/471.1 |

FOREIGN PATENTS OR APPLICATIONS

594,153  9/1925  France................. 29/500

*Primary Examiner*—Charlie T. Moon
*Attorney, Agent, or Firm*—Wegner, Stellman, McCord, Wiles & Wood

[57] ABSTRACT

An apparatus and method for feeding, cutting and substantially simultaneously applying strip solder material to an assembly comprising a plurality of workpieces preliminary to soldering the workpieces to another member in which there are provided means for retaining the workpieces in predetermined positions relative to each other, feeding the strip solder material into simultaneous contact with adjacent corresponding surfaces of the workpieces, cutting the strip material to provide a cut strip of predetermined length sufficient for this simultaneous contact and shaping means for bending the cut strip at the ends of the cut strip into wrap-around gripping engagement with the sides of the assembly of workpieces.

15 Claims, 3 Drawing Figures

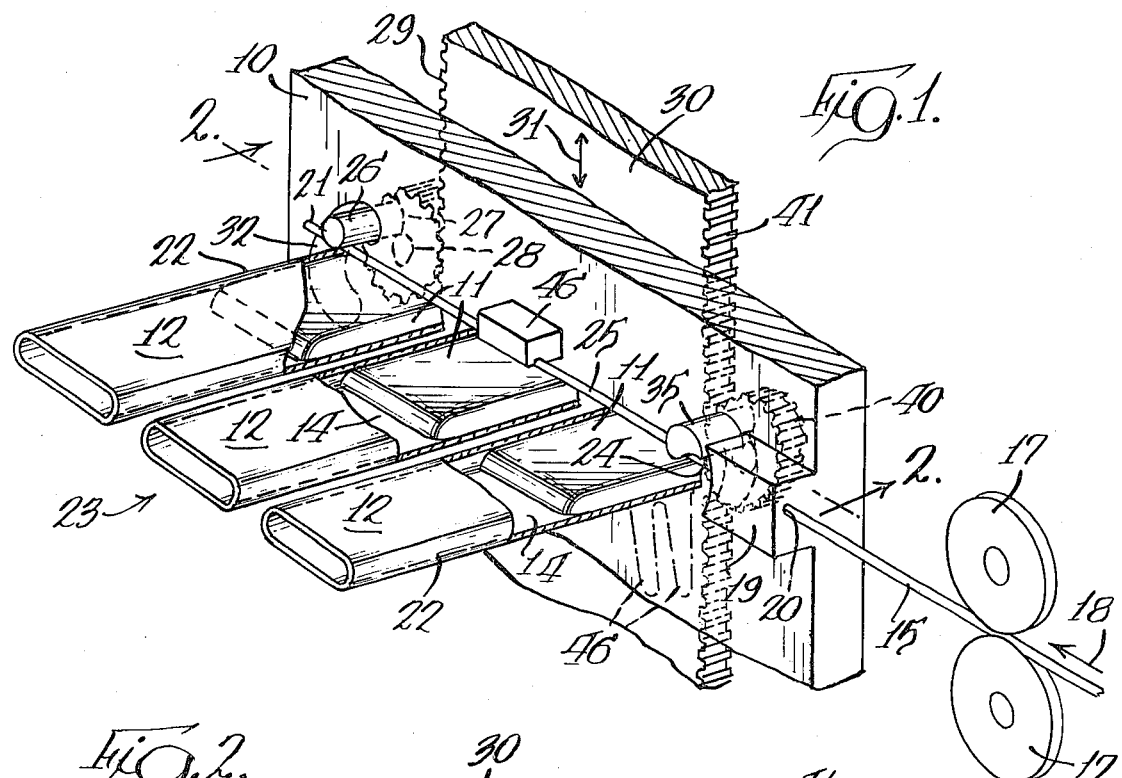
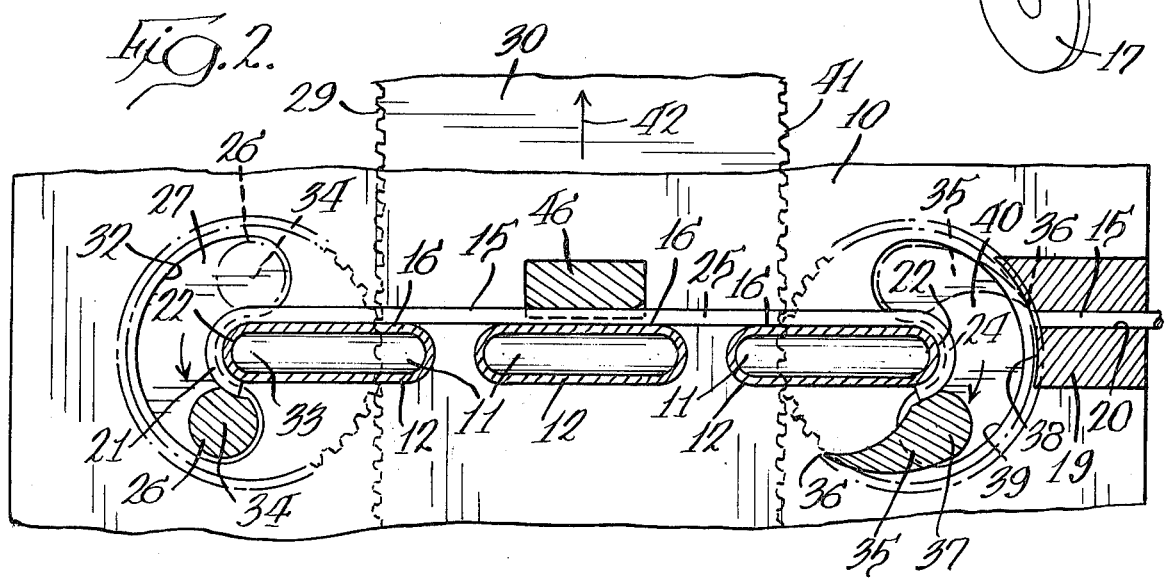
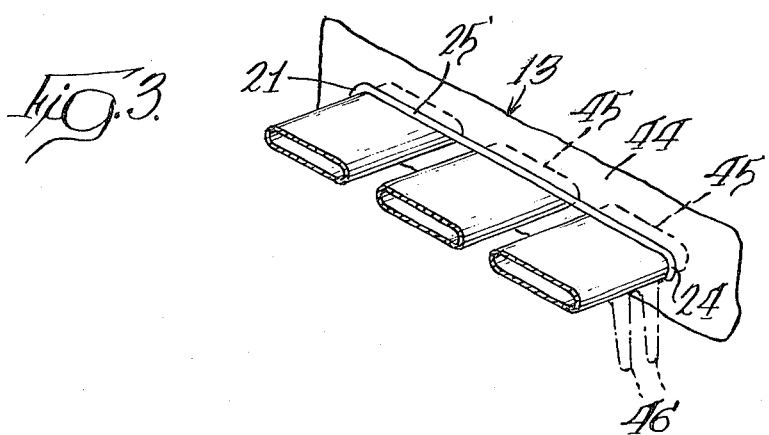

APPARATUS AND METHOD FOR APPLYING STRIP SOLDER MATERIAL

BACKGROUND OF THE INVENTION

This invention relates to an apparatus for mechanically cutting and applying strip material and especially strip solder material to a plurality of workpieces preparatory to activating the solder material for bonding the workpieces to another member.

Another feature of the invention is to provide a method of feeding, cutting and substantially simultaneously applying strip solder material to an assembly comprising a plurality of workpieces preliminary to soldering the workpieces to another member.

BRIEF DESCRIPTION OF THE DRAWINGS

FIG. 1 is a fragmentary perspective view partially in section of an apparatus for practicing the invention.

FIG. 2 is a fragmentary vertical sectional view taken substantially along line 2—2 of FIG. 1.

FIG. 3 is a fragmentary semi-schematic perspective view illustrating a further step in practicing the invention.

DESCRIPTION OF THE PREFERRED EMBODIMENT

In the embodiment illustrated in the drawings the apparatus comprises a retaining means in the form of a generally vertical plate 10 from which project spears 11 for retaining the workpieces here disclosed as heat exchanger tubes 12 of flattened oval cross section in predetermined positions relative to each other such as in the side-by-side configuration of FIGS. 1 and 2 which is the position that they will occupy in the completed heat exchanger 13.

Thus as illustrated the coplanar spaced spears 11 are of a size to fit snugly within the hollow interiors 14 of the tubes 12 preparatory to applying the strip solder material.

This strip solder material in this embodiment is in the form of a wire 15 which is fed into the apparatus to lie along the tops 16 of the tubes 12. The feeding means including the feeding rollers 17 feeds the strip or wire 15 longiutdinally as indicated by the arrow 18 into simultaneous contact with the tops 16 of the tubes which are of course adjacent corresponding surfaces of the tube workpieces. In order to guide this wire into the proper position the wire is passed through a feed plate 19 that contains a straight horizontal opening 20 that guides the wire across the tops 16 of the tubes under the force of the feeding means embodied in the feed rollers 17.

When the strip solder material 15 has been fed to the proper position the forward end 21 of the solder will extend beyond the adjacent side 22 of the assembly 23 of workpieces or tubes 12. The solder wire 15 at the other end 24 will be adjacent the feed plate projection 19.

The apparatus also includes shaping means for bending the strip 25 of solder material between these ends 21 and 24 into wrap-around gripping engagement with the sides 22 of the assembly 23 of workpieces in the manner illustrated in FIG. 2.

The shaping means also severs the strip of solder material into successive lengths 25 with the result that the strips are simultaneously cut to proper length and shaped. The structure for achieving this is the following.

Adjacent to the forward end 21 of the solder there is provided an arcuately movable forming pin 26 that is mounted off center on a gear 27 with this gear being rotatable about its axis of rotation 28 by engagement with the side rack teeth 29 of a vertically movable rack 30 which is movable by means not shown upwardly and downwardly in a vertical direction as indicated by the arrow 31.

As the rack is moved vertically upwardly the gear 27 moves in an arc through a slot 32 in the stationary plate 10 to the position shown in FIG. 2 thereby bending the end 21 of the cut strip of solder wire 15 to the contour of the side 22 of the assembly of tubes 12.

In order to bend the wire end 21 into a snug wrap-around arrangement the parts are so dimensioned that the side axis 33 of the end tube 12 substantially coincides with the axis 28 of rotation of the gear 27 and the spacing of the center 34 of the pin 26 from this side axis 33 is substantially equal to the thickness of the solder wire 15 plus the thickness of the end tube 12.

At the same time the opposite end 24 of the cut wire strip 15 is similarly bent around the opposite side 22 of the tubular assembly while the strip of wire is severed from the remainder of the wire 15. The severing and simultaneous wrap-around bending of the wire end 24 is accomplished by a cutter and former 35 that is similar to the forming pin 26 except also provided with a leading cutting edge 36. This cutter and former 35 has a central axis 37 that is similar to the axis 34 of the forming pin 26 so far as its relationship to the wire end 24 and adjacent tube 12 are concerned.

In FIG. 2 the broken line showing of the pin 26 and cutter and former 35 are their positions at the beginning of the forming operation. Their positions at the end are shown in FIG. 2 in solid lines and of course in cross section because of the location of the section line 2—2 in FIG. 1.

In order to provide for a smooth severing the cutting edge 26 during its movement from the broken line position to the solid line position of FIG. 2 operates against an arcuate cutting surface 38 that is here shown as the end of the feed plate wire guide 19.

As with the forming pin 26 the cutter and former 35 is arcuately movable through a slot 39 which is similar to the slot 32 through which the pin 26 moves. This former 35 is also mounted off-center on a gear 40 that engages rack teeth 41 on the other side of the vertical rack 30. As this rack is moved upwardly as indicated by the arrow 42 in FIG. 2 the gears 27 and 40 are rotated simultaneously by the rack 30 so that the gear 27 in FIG. 2 rotates counterclockwise while the gear 40 as viewed in FIG. 2 rotates clockwise with the result that the length 25 of strip or wire solder material 15 is cut and wrapped at the ends to the configuration shown in FIGS. 2 and 3.

The applying of the solder to the tube ends is preparatory to completing the heat exchanger which will include applying a header plate 44 over the projecting ends 45 of the tubes 12 and applying metal fins indicated schematically at 46 between the assembly or row 23 of tubes and the next succeeding row of tubes which are not shown.

In the method of practicing this invention the tube ends 45 are side-by-side and spaced properly to receive the projecting spears 11 as shown in FIG. 1. The feeding mechanism including the rollers 17 are then activated to feed the strip solder wire forwardly in the direction 18 to overlie the tops 16 of the tube assembly 23 where the strip 25 not only passes along the tops 16 but also beneath a base plate 46 also on the plate 10 that holds the top of the strip 25 and prevents the strip bulging upwardly away from the tops 16 of the tubes when the ends 21 and 24 are formed.

Once the strip of solder material is in the proper position as shown in the drawings the rack is moved vertically which as described above immediately severs the length or strip 25 of solder material from the remainder whose end is then within the feed plate 19 as shown in FIG. 2.

Once the strip of solder material has been thusly applied the spears 11 are withdrawn from the ends of the tubes 12 and the heat exchanger assembly is completed as by applying the header plate 44, fins 46 and succeeding assemblies 23 of heat exchanger tubes 12 and fins in the customary manner. After this the entire assembly is heated as is usual which melts the solder and joins the parts together as is customary.

As can be seen from the above description the invention has a number of advantages both in the apparatus and in the method in that the invention lends itself to high speed feeding, cutting and substantially simultaneously applying strip solder material to an assembly comprising a plurality of workpieces preliminary to soldering the workpieces to another member. In the illustrated embodiment the workpieces are embodied in the assembly 23 of tubes 12 and the other member includes the header plate 44 as well as the fins 46 and other parts associated with the heat exchanger.

In practicing the invention the successive banks of tubes 22 of which only one 23 is shown for illustrative purposes are held in spaced relationship from each other and from adjacent banks by applying the fins 46 and fastening them to the tubes prior to the applying of the solder wire 15 by the use of the apparatus and method of this invention.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. Apparatus for feeding, cutting and substantially simultaneously applying strip solder material to an assembly comprising a plurality of workpieces preliminary to soldering the workpieces to another member, comprising: retaining means for retaining said workpieces in predetermined positions relative to each other; feeding means for feeding said strip solder material into simultaneous contact with adjacent corresponding surfaces of said workpieces; cutting means for cutting said strip material to provide a cut strip of predetermined length sufficient for said simultaneous contact; and shaping means for bending the said cut strip at the ends thereof into wrap-around gripping engagement with the sides of said assembly of workpieces.

2. The apparatus of claim 1 wherein said means for retaining comprises a base having means thereon spaced similarly to said workpieces in said assembly for engaging said workpieces and retaining them in fixed position.

3. The apparatus of claim 2 wherein said workpieces comprise adjacent members with hollow portions and said retaining means comprise projections extending from said base member and snugly received within said hollow portions.

4. The apparatus of claim 1 wherein said means for feeding said strip solder material into said contact comprises drive means for moving said strip material longitudinally and guide means for directing said strip material into said contact.

5. The apparatus of claim 4 wherein said means for retaining comprises a base and said guide means is mounted on said base adjacent to said projections.

6. The apparatus of claim 1 wherein said means for feeding said strip solder material into said contact comprises drive means for moving said strip material longitudinally and guide means for directing said strip material into said contact and said guide means comprises said cutting means and said shaping means.

7. The apparatus of claim 1 wherein said means for feeding said strip solder material into said contact comprises drive means for moving said strip material longitudinally and guide means for directing said strip material into said contact and said guide means comprises a stop means for engaging an intermediate portion of said cut strip to prevent distortion of said cut strip away from said workpieces during said bending.

8. The apparatus of claim 1 wherein said means for bending said strip solder material comprises a pair of arcuately movable members engaging the ends of said cut strip and movable through an arc corresponding to the shape of said sides of said assembly for bending said material around and in snug engagement with said sides.

9. The apparatus of claim 8 wherein said means for distorting further includes a stop means located intermediate the ends of said cut strip for engaging the strip on the side opposite said workpieces for preventing distortion of said strip away from said workpieces during said distorting of the ends of the strip material.

10. The apparatus of claim 1 wherein said means for cutting comprises a rotatable cutter adjacent to said means for feeding and forming a part of said shaping means.

11. The apparatus of claim 10 wherein said means for cutting comprises a cutting member mounted on said shaping means and including a cutting edge engaging a cutting surface that is integral with said guide means for severing said strip material at said guide means.

12. The method of forming, cutting and substantially simultaneously applying strip solder material to an assembly comprising a plurality of workpieces preliminary to soldering the workpieces to another member, comprising: retaining the workpieces in predetermined positions relative to each other; feeding a strip of solder material into simultaneous contact with adjacent corresponding surfaces of said workpieces; cutting said strip material to provide a cut strip having a predetermined length sufficient for said simultaneous contact with the ends of said cut strip projecting beyond the sides of said assembly; and bending the projecting ends of said cut strip into wrap-around gripping engagement with said sides of said assembly.

13. The method of claim 12 wherein said workpieces comprise adjacent members with hollow portions and said retaining comprises projecting fixed retaining means into said hollow portions for snug engagement therewith.

14. The method of claim 12 wherein said cutting and said bending at one said side are substantially simultaneous.

15. The method of claim 12 wherein the intermediate portion of said cut strip between said ends is retained against bulging away from said assembly of workpieces during said bending.

* * * * *